United States Patent
Huras et al.

(10) Patent No.: US 8,874,860 B2
(45) Date of Patent: Oct. 28, 2014

(54) LOGICAL BUFFER POOL EXTENSION

(71) Applicant: International Business Machines Corporation, Armonk, NY (US)

(72) Inventors: Matthew A. Huras, Markham (CA); Aamer Sachedina, Markham (CA)

(73) Assignee: International Business Machines Corporation, Armonk, NY (US)

(*) Notice: Subject to any disclaimer, the term of this patent is extended or adjusted under 35 U.S.C. 154(b) by 133 days.

(21) Appl. No.: 13/708,058

(22) Filed: Dec. 7, 2012

(65) Prior Publication Data

US 2013/0151786 A1 Jun. 13, 2013

(30) Foreign Application Priority Data

Dec. 9, 2011 (CA) .................................. 2761553

(51) Int. Cl.
- G06F 13/14 (2006.01)
- G06F 12/08 (2006.01)
- G06F 12/12 (2006.01)
- G06F 3/06 (2006.01)

(52) U.S. Cl.
CPC ............ *G06F 12/0891* (2013.01); *G06F 3/068* (2013.01); *G06F 3/0656* (2013.01); *G06F 12/0868* (2013.01); *G06F 12/0888* (2013.01); *G06F 2212/217* (2013.01); *G06F 12/12* (2013.01); *G06F 2212/1016* (2013.01)
USPC ............ 711/159; 710/53; 711/154; 711/160; 711/171

(58) Field of Classification Search
USPC ..................... 710/53; 711/154, 159, 160, 171
See application file for complete search history.

(56) References Cited

U.S. PATENT DOCUMENTS

| | | | |
|---|---|---|---|
| 7,321,956 B2* | 1/2008 | Gschwind et al. | 711/145 |
| 7,330,938 B2* | 2/2008 | Nenov et al. | 711/135 |
| 2001/0013870 A1* | 8/2001 | Pentkovski et al. | 345/557 |
| 2010/0106604 A1 | 4/2010 | Bhatia et al. | |
| 2010/0199036 A1 | 8/2010 | Siewert et al. | |
| 2010/0211731 A1 | 8/2010 | Mittendorff et al. | |
| 2010/0262633 A1 | 10/2010 | Bhattacharjee et al. | |
| 2010/0306288 A1 | 12/2010 | Stein et al. | |

FOREIGN PATENT DOCUMENTS

WO 2010106604 A1 9/2010

OTHER PUBLICATIONS

B. Khessib., "Using Solid State Drives As a Mid-Tier Cache in Enterprise Database OLTP Applications." Microsoft Corporation, pp. 1-18, 2010.
M. Canim et al., "SSD Bufferpool Extensions for Database Systems." Proceedings of the VLDB Endowment, 2010, pp. 1435-1446, vol. 3, No. 2.
M. Teter, "Flash Technology Revolutionizing the IT Infrastructure." Advanced Systems Group: 2010, pp. 1-3.

* cited by examiner

*Primary Examiner* — Jae Yu
(74) *Attorney, Agent, or Firm* — Cantor Colburn LLP

(57) ABSTRACT

A method for logical buffer pool extension identifies a page in a memory for eviction, and analyzes characteristics of the page to form a differentiated page. The characteristics of the page include descriptors that include a workload type, a page weight, a page type, frequency of access and timing of most recent access. The method also identifies a target location for the differentiated page from a set of locations including a fastcache storage and a hard disk storage to form an identified target location. The method further selects an eviction operation from a set of eviction operations using the characteristics of the differentiated page and the identified target location. The differentiated page is written to the identified target location using the selected eviction operation, where the differentiated page is written only to the fastcache storage.

20 Claims, 5 Drawing Sheets

Fastcache system 300

LOGICAL BUFFER POOL EXTENSION

PRIORITY

This application claims priority to Canadian Patent Application No. 2761553, filed Dec. 9, 2011, and all the benefits accruing therefrom under 35 U.S.C. §119, the contents of which in its entirety are herein incorporated by reference.

BACKGROUND

This disclosure relates generally to storage management in a data processing system, and more specifically, to logical buffer pool extension in a data processing system.

In selected applications where flash memory provides better performance and/or lower cost, flash memory is being used in place of traditional storage mediums (e.g., disks). Accordingly, exploitation of flash memory technology in database systems, for the purpose of providing better performance at lower cost, has become very important. Existing approaches to exploiting the use of flash memory technology in databases systems include using flash storage transparently as a faster disk/tablespace and direct addressing of flash storage from a database buffer pool.

Existing approaches to exploiting the use of flash memory typically have disadvantages including, in one example, operation at a tablespace level, which accordingly has coarse granularity. Entire objects (e.g., tables) must be placed in the flash storage. Individual pages, which are hotter than other pages (i.e., they are more frequently accessed), cannot be specifically placed in a flash memory cache. This approach also typically requires explicit administrative attention to manage and optimize data placement, using empirical data. Explicit administrative attention however does not leverage internal knowledge of the frequency of access characteristics of different data in the database, which is typically known to the database manager. In another example internal access frequency information is used to automatically place hot data into flash storage. However, current approaches typically suffer from other significant disadvantages. In particular, persistence of the content of the flash memory is not maintained, thus resulting in loss of content over system shutdowns and more importantly, no ability to place dirty (updated) data in the flash memory cache.

In another example, rather than treating disk and flash storage as alternative storage options at a same level of a storage hierarchy, flash storage and disk storage are treated hierarchically. All data is initially stored on the disk, and over time, high-value data is identified and stored in the flash storage. This high-value data is kept current on both the flash storage and the disk drive. Other low-value data is current only on the disk, and not resident on the flash storage. Thus, the flash storage behaves like a write-through cache. As with traditional caches, one needs to define suitable admission and replacement policies to optimize performance.

In another example using both software and hardware flash storage caching, a write through caching approach is implemented. In software flash storage caching, a data structure that maps database disk pages to flash storage pages resides in memory. Since memory is volatile, these data structures are lost when power is removed or the system fails leading to data loss. Second, there is concern about the flash storage endurance caused by cell wear. A write-through reduces writes to the flash storage cache, ensuring a longer life span.

In another example, proposed advanced file systems purport to automatically use flash storage for both writes and reads using specific flash storage pools. The proposed file systems can determine data access patterns and store frequently accessed data in a flash-based, level-two read cache. However for sequential writes, the proposed file system utilizes an inherent burst bandwidth of a hard disk. The proposed file systems further constrain use of flash storage by generally restricting physical access to flash storage to a single host system, unless the flash storage is being shared via an exported network file system managed volume. The proposed advanced files systems suggest flash storage is therefore better suited for use in a hybrid storage pool combination of flash storage and traditional hard disk drives.

BRIEF SUMMARY

An embodiment includes a method for logical buffer pool extension that identifies a page in a memory for eviction, and analyzes characteristics of the page to form a differentiated page. The characteristics of the page include descriptors that include a workload type, a page weight, a page type, frequency of access and timing of most recent access. The method also identifies a target location for the differentiated page from a set of locations including a fastcache storage and a hard disk storage to form an identified target location. The method further selects an eviction operation from a set of eviction operations using the characteristics of the differentiated page and the identified target location. The differentiated page is written to the identified target location using the selected eviction operation, where the differentiated page is written only to the fastcache storage.

Another embodiment includes a computer program product for logical buffer pool extension. The computer program product includes a computer readable storage medium having program code embodied therewith, the program code executable by a processor to perform a method that identifies a page in a memory for eviction, and analyzes characteristics of the page to form a differentiated page. The characteristics of the page include descriptors that include a workload type, a page weight, a page type, frequency of access and timing of most recent access. The method also identifies a target location for the differentiated page from a set of locations including a fastcache storage and a hard disk storage to form an identified target location. The method further selects an eviction operation from a set of eviction operations using the characteristics of the differentiated page and the identified target location. The differentiated page is written to the identified target location using the selected eviction operation, where the differentiated page is written only to the fastcache storage.

A further embodiment includes an apparatus for logical buffer pool extension. The apparatus includes a communications fabric, a memory connected to the communications fabric that contains computer executable program code, and a processor unit connected to the communications fabric. The processor unit executes the computer executable program code to direct the apparatus to identify a page in a memory for eviction, and analyze characteristics of the page to form a differentiated page. The characteristics of the page include descriptors that include a workload type, a page weight, a page type, frequency of access and timing of most recent access. The apparatus is further directed to identify a target location for the differentiated page from a set of locations that include a fastcache storage and a hard disk storage to form an identified target location. An eviction operation is selected from a set of eviction operations using the characteristics of the differentiated page and the identified target location. The differentiated page is written to the identified target location using the selected eviction operation, where the differentiated page is written only to the fastcache storage.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
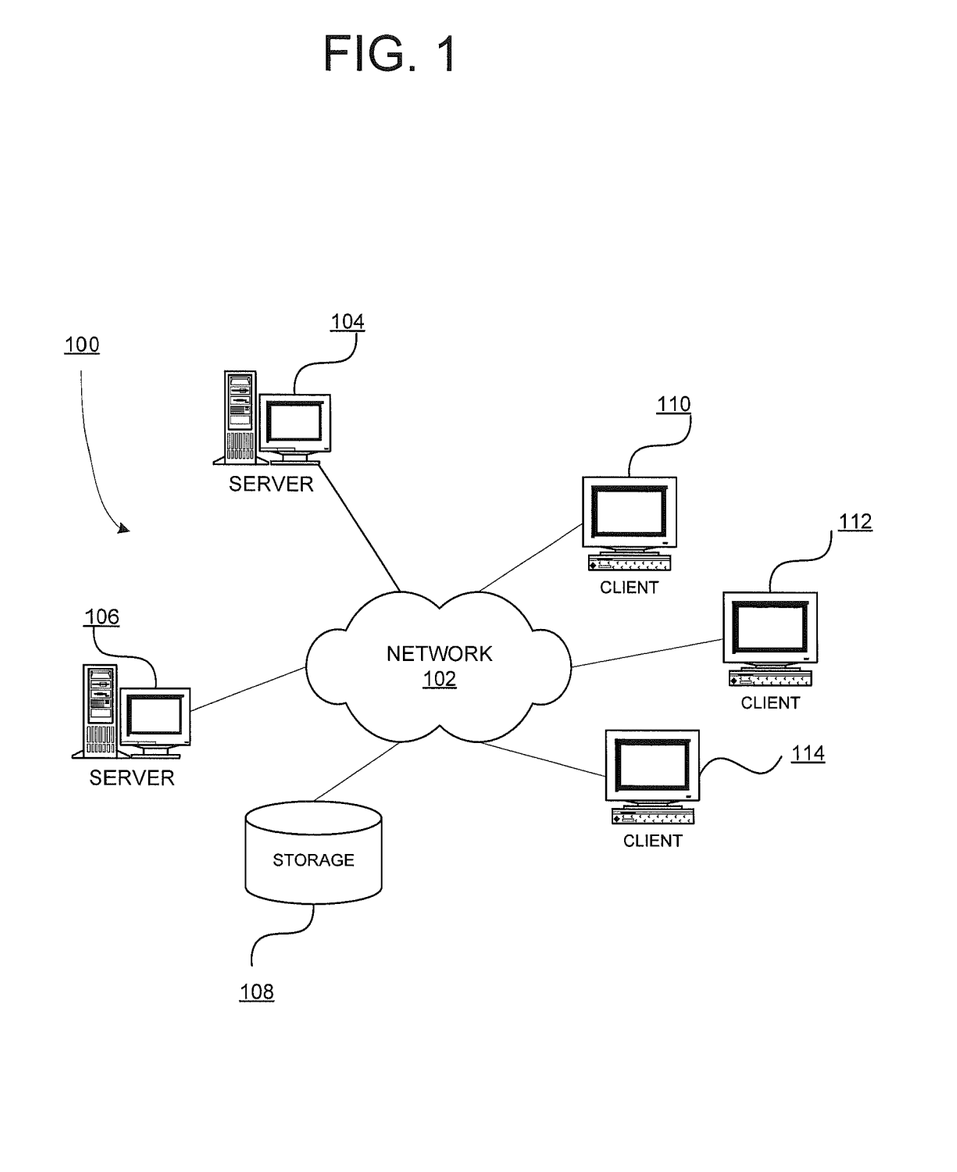
FIG. 1 is a block diagram of an exemplary network data processing system operable for various embodiments of the disclosure.
Figure 2:
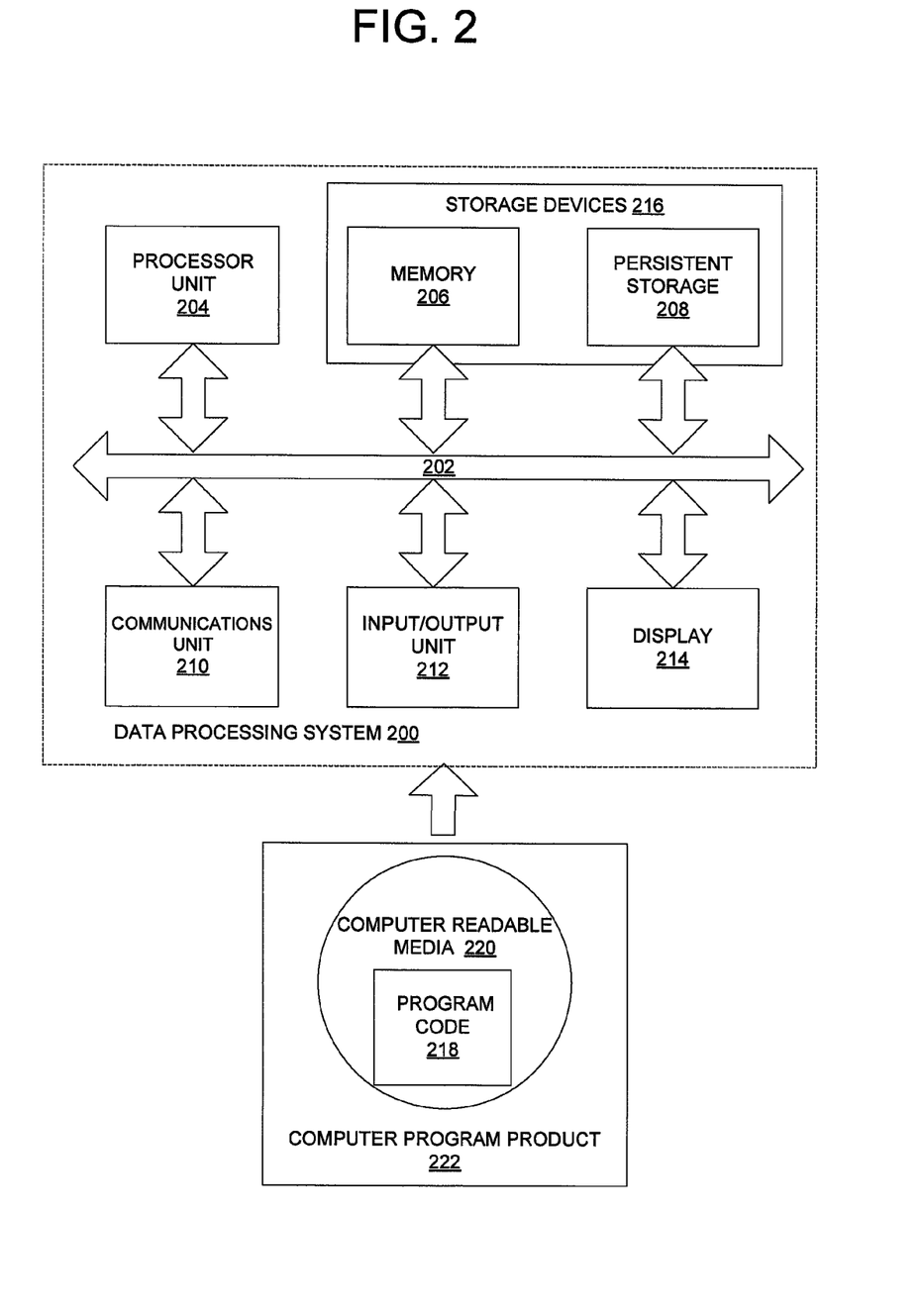
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

As shown in FIG. 1, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

As shown in FIG. 1, network data processing system 100 is the Internet with network 102 representing a worldwide collection of networks and gateways that use, for example, the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2, a block diagram of an exemplary data processing system operable for various embodiments of the disclosure is presented. As shown in FIG. 2, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of nontangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for logical buffer pool extension is presented. Processor unit 204 identifies a page in a memory, such as memory 206 for eviction, analyzes characteristics of the page to form a differentiated page (wherein the characteristics of the page comprise descriptors including a workload type, a page weight, a page type, frequency of access and timing of most recent access) and identifies a target location, using storage devices 216, for the differentiated page from a set of locations including a fastcache storage and a hard disk storage to form an identified target location. Processor unit 204 further selects an eviction operation from a set of eviction operations using the characteristics of the differentiated page and the identified target location and writes the differentiated page to the identified target location using the selected eviction operation wherein the differentiated page is written only to the fastcache storage. Processor unit 204 may be a single processor unit or one of a set of processor units.

Embodiments of the disclosed process enable finer granularity for selecting candidate working set data for placement into flash storage as well as providing a capability for placing dirty pages into the flash storage. In an embodiment of the disclosed process, existing storage management support using buffer pools is extended to manage the flash storage as a logical extension of the buffer pools. Flash storage in this example represents storage having a capability between that of buffer pool memory and hard disk storage in which the flash storage performance is more closely aligned with buffer pool memory performance while maintaining the persistence associated with hard disk storage.

Figure 3:
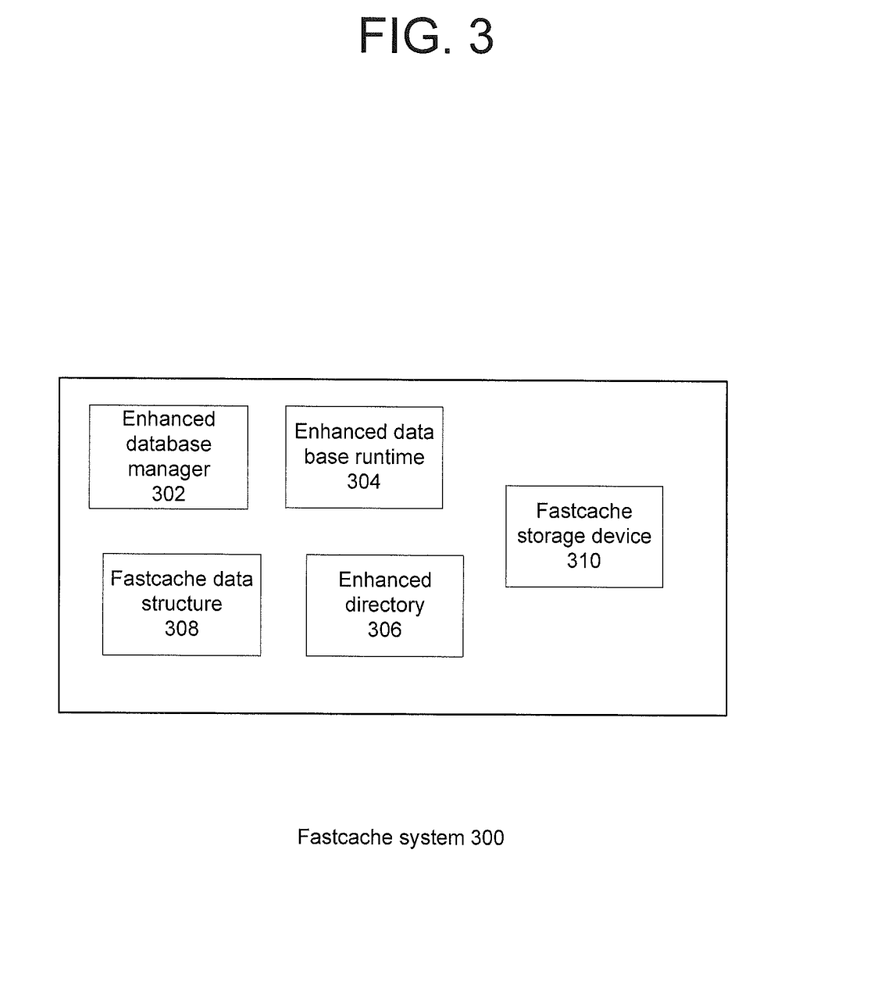
FIG. 3 is a block diagram of components of a fastcache system operable for various embodiments of the disclosure.

With reference to FIG. 3, a block diagram of components of a fastcache system operable for various embodiments of the disclosure is presented. Fastcache system 300 is an example of an embodiment of the disclosure forming a logical extension of primary buffer pool(s) of a database management system to provide a capability of fast access to recently accessed data, distinguishing the data accessed by a type of operation and usage.

Fastcache system 300 leverages support of a data processing system such as data processing 200 of FIG. 2 or a system of network data processing 100 of FIG. 1. The embodiment of the fastcache system 300 shown in FIG. 3 comprises a number of components including enhanced database manager 302, enhanced database runtime 304, enhanced directory 306, fastcache data structure 308 and fastcache storage device 310.

Components, including enhanced database manager 302, enhanced database runtime 304, and enhanced directory 306, are typically implemented as extensions of an existing database management system implementation. Enhanced database manager 302 provides a capability of programmatic interfaces directed toward storage management. Specific storage management extensions are made to support interfaces necessary to define and manage fastcache storage. For example, program interfaces are provided to specify which types of pages primarily stored in buffer pools are candidate pages for storage on the fastcache storage.

Enhanced database manager 302 enables continued use of well-established page weight algorithms of the database manager to ensure that pages most relevant from the perspective of enhanced database manager 302 are placed in first tier storage. Page specification capability of enhanced database manager 302 enables placement of identified pages in first tier storage as opposed to alternative solutions using a lower layer implementation. For example, using enhanced database manager 302, backup images, load input files, or a log data set gone awry would not be a candidate for first tier storage.

In an illustrative embodiment, enhanced database manager 302 includes a capability to define and manage a fastcache storage group. In an embodiment, a database user is enabled to create a storage group and provide storage paths. Each storage path is a path on a file system backed by fastcache storage. A storage group, while a new concept, is implemented in the storage management layer of the database manager of the embodiment. For example, an automatic storage feature of an existing database manager creates a default storage group from which application tablespaces provision containers. In addition the user designates the storage group created with the fastcache storage as a second level store-in cache for the database or optionally for specific buffer pools.

For example, using a programming interface of enhanced database manager 302, a sample structured query language (SQL) statement instructing enhanced database manager 302 to create a storage group, "sgname", may be provided in the form of a programming interface statement as DB CREATE STORAGE GROUP [sgname] ON [paths,] AS FASTCACHE [FOR [bufferpool names,]]. To create a storage group, "MYSG", as fastcache for a database (applies to all buffer pools) with storage paths /ssd1 and /ssd2, which are file systems each backed by logical unit numbers (LUNS) created using solid state device based storage a sample SQL statement such as DB CREATE STORAGE GROUP MYSG ON /ssd1, /ssd2 AS FASTCACHE may be used.

In another example, tablespaces can either be enabled for FASTCACHE by default, or optionally. A new FASTCACHE attribute is added to a CREATE/ALTER TABLESPACE clause, as in the example SQL statement of DB CREATE/ALTER TABLESPACE [existing clause] [FASTCACHE ON|OFF]. Thus, an administrator can selectively specify whether pages from a particular tablespace qualify to be stored in FASTCACHE.

Using the previous example, a typical default might have all tablespaces participate in using FASTCACHE and enable the administrator to exclude specific tablespaces (for example, tablespaces storing journal tables) from using FASTCACHE.

Fastcache device (e.g., solid-state device) backed paths can be added and old paths removed dynamically from a FASTCACHE enabled storage group. An administrator might choose to add devices to increase the size of FASTCACHE, because for example, the working set of data accessed each quarter increases and maintaining the working set data in cache is important for performance. An example SQL statement of DB ALTER STORAGE GROUP FASTCACHE ADD /sg3, /sg4 or DB ALTER STORAGE GROUP FASTCACHE REMOVE /sg2 may be used to adjust the size of the current allocation of FASTCACHE.

Enhanced database runtime 304 provides a capability to execute the interfaces provided by enhanced database manager 302 to manage placement of specific pages to and from fastcache storage. Page characteristics may be derived from a page header file having a known format including a type field.

For example, the type field indicates a page as an index page or a data page. In another example, page characteristics may be derived from association with a workload type. In another example, a weight assignment by a buffer manager may be used as a hint of page utilization and accordingly placement.

Migration of data between the fastcache storage and traditional disks (longer term storage) is programmatically managed by enhanced database runtime 304 completely transparent to users and applications. Zero or near zero administration is required unlike previous alternative hierarchical storage management techniques, which require definition of policies to govern data movement. When data classified as cold (e.g., because the data is accessed less frequently) is referenced, the data is programmatically managed by enhanced database runtime 304 as part of a current working-set and is cached in the buffer pool or solid-state fastcache storage. The data will age out automatically when the reference is no longer used.

Further, enhanced database runtime 304 ensures cold data not recently used, will not be cached in either the buffer pool or fastcache storage. The cold data however will continue to be online and accessible but only at disk speeds, having been placed in the lower performing tier of storage. In view of the page management, overall storage cost may be typically reduced because only a portion of the total storage provided needs to be high performance. The remaining data can typically be stored on less costly but still reliable hard drives using a redundant array of independent disks or also referred to as redundant array of inexpensive disks (RAID) configuration.

Enhanced directory 306 provides a capability to manage information associated with page location for referencing pages located in fastcache storage. For example, enhanced directory 306 may be viewed as a logical extension of an existing buffer pool directory service. The enhanced directory service provides a capability of identifying a location of a page whether the page is in a buffer pool or fastcache storage. Solid state devices used as an extension of primary buffer pool(s) of a database manager typically enable fast access to recently accessed data thus ensuring a 'working-set' of data (for example, data representative of a current quarter of a year) remains either in memory in the primary buffer pool(s) or on storage backed by solid state devices with access times that are substantially faster than a remaining portion of the data in the database.

In an embodiment, fastcache storage device 310 is implemented by a storage unit and provides a capability to store, maintain and retrieve data while also having a persistent characteristic. In an example embodiment, fastcache storage device 310 is implemented as a solid-state device, but this specific example is not meant as a limitation. Fastcache storage device 310 provides a performance capability more closely associated with that of buffer pool memory in combination with a persistent characteristic similar to a hard disk storage device. An embodiment of fastcache system 300 typically reduces storage hardware costs by using storage devices, for example, solid state devices as a first tier storage of data managed by a database manager enabling use of less costly hard disk storage types for long term second tier storage, without sacrificing performance.

An embodiment of fastcache system 300 typically reduces a number of physical device spindles needed to support a given I/O bandwidth because of the performance of fastcache storage device 310. Data that is likely to be accessed for regular reports/queries is fetched from fastcache storage device 310 rather than physical hard disk storage. Using an embodiment of fastcache system 300 typically enables storage of cold data, unlikely to be accessed, on lower performing devices.

Figure 4:
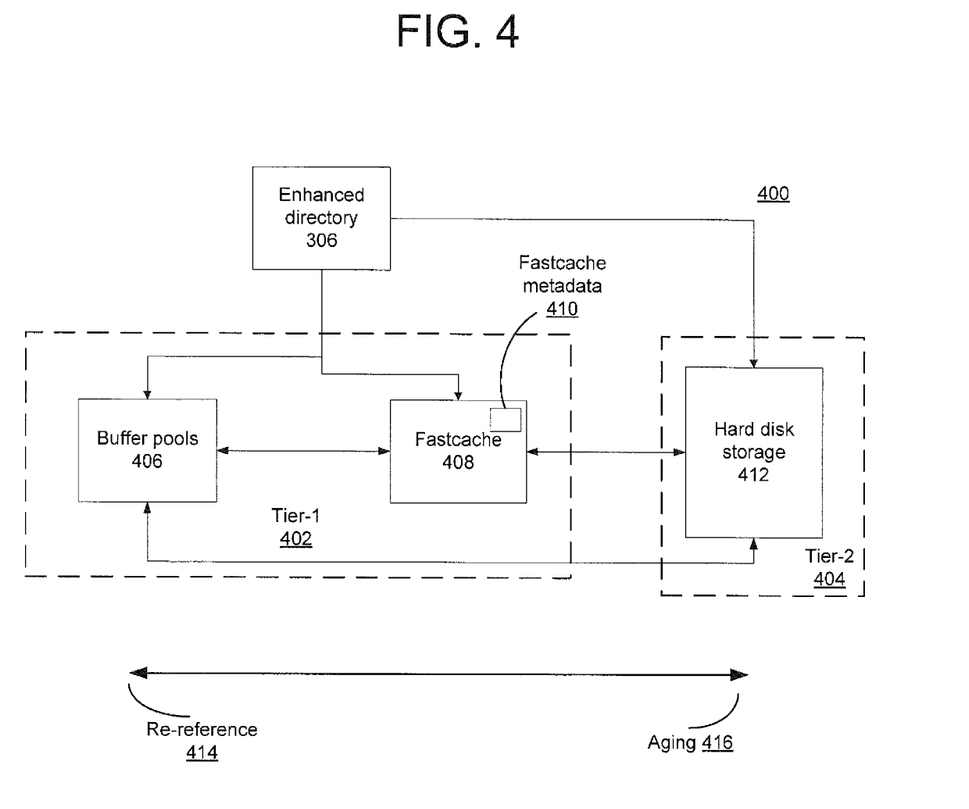
FIG. 4 is a block diagram of a storage system using the fastcache system of FIG. 3, in accordance with an embodiment of the disclosure.

With reference to FIG. 4, a block diagram of a storage system using the fastcache system of FIG. 3 operable for various embodiments of the disclosure is presented. Storage system 400 is an example of an embodiment of fastcache system of FIG. 3 forming an extension of primary buffer pool(s) of a database management system.

The example of storage system 400 provides a logical view of buffer pool extension to include use of fastcache system 300 of FIG. 3. Storage system 400 comprises a logical partition of storage represented as Tier-1 402 comprising buffer pools 406 and fastcache 408. A second logical partition of storage represented as Tier-2 404 comprises hard disk storage 412. The hard disk storage also represents a physical partitioning of storage using different device type and characteristics.

Existing database management system architecture typically has a single level of main memory cache called a buffer pool, such as buffer pools 406. Pages most likely accessed by applications are maintained in buffer pools 406 thereby minimizing I/O and maximizing system performance.

When a page containing data required by an application is not found in buffer pools 406, hard disk storage 412 access to a tablespace container containing an on-disk copy of the page using a directory is required. Buffer pool methods of the database management system are designed to select a page least likely to be re-referenced as a victim slot. The victim page is evicted from buffer pools 406 and the required page is read in from hard disk storage 412 in place of the evicted page. Recalling a previously used page from hard disk storage 412 is referred to as re-reference 414, indicating a movement direction toward buffer pool 406, while a migration using methods to move a victim page to hard disk storage 412 is referred to as aging 416.

Unfortunately buffer pool sizes are limited by main memory sizes typically measured in tens of gigabytes (GB), while a working set of data in a data warehouse or other enterprise application tends to be much larger than what can be accommodated in main memory. Accordingly most of the data that is part of the working set of data accessed on a day-to-day basis for reporting and other queries cannot reside in the buffer pool. Therefore, when processing reports a large amount of typically slow (relative to processor speed) I/O is required.

This is one reason that disks in an enterprise data warehouse and other enterprise systems tend to the most expensive kind, for example, high-speed fiber channel disks. Since a disk is a mechanical device, the fastest disks are best to ensure a system does not become I/O bound. Because even fast disks are substantially slower than processors, many physical disks are required to ensure enough mechanical spindles are available to serve data at a rate processor cores can consume.

When fastcache system 300 of FIG. 3 is used in the example of storage system 400, buffer pool management methods are altered to use the additional level of cache, such as fastcache 408, instead of evicting pages from the primary source of buffer pools 406 to hard disk storage 412. Enhanced directory 306 provides information for page locations in fastcache 408 using the same type of information as used for buffer pools 406. Enhanced directory 306 provides a capability of a logical extension of buffer pools 406 to include fastcache 408. When a page that is not in buffer pools 406 is located in fastcache 408 using enhanced directory 306 the page is read into buffer pools 406 without going to a disk location on hard disk storage 412 and having to wait for (slow) disk I/O.

Fastcache 408 is tightly integrated with buffer pools 406. The same victim selection methods that the database manager uses to transfer a page from buffer pools 406 are used to age pages out of fastcache 408 when there is no more space in fastcache 408 for the database manager to transfer a page. The tight integration enables a hash table structure typically represented as a directory of pages in buffer pools 406, to include not only descriptors to pages in the primary buffer pool but also descriptors to pages in fastcache 408. Accordingly, when an application (for example a query) needs to access a page that cannot be located in buffer pools 406, the database buffer manager will immediately know whether that page is in fastcache 408 and at which location. The identified and located page is read from fastcache 408 without going to a physical disk location.

Embodiments of storage system 400 reuse existing buffer pool management code including page victim selection, cleaning, and tracking of page weights. Page weight tracking for pages in fastcache 408 (for example, tier-1 402 storage) is done in memory rather than on hard disk (for example, using an extent or space map page) and thus does not require on disk structure changes to accommodate information about frequency of access or timing of most recent access. The page weight tracking for pages using fastcache 408 also does not require unnecessary references of metadata pages when updating the page weight tracking information.

Embodiments of storage system 400 using a fastcache 408 solution operate on a page level, whereas a previous storage layer based solution would typically operate by extent. Using fastcache 408 as a solution accordingly enables a finer grained operation than what could typically be achieved at the database storage layer.

Embodiments of storage system 400 enable different options for management of pages that are dirty in buffer pools 406. Dirty pages are pages that have updates that have not been applied to corresponding on-disk (tablespace) locations. One available option writes data of the page to an on-disk location and to fastcache 408 concurrently when such a page is selected as a victim to be evicted from buffer pools 406. Using this option, when the page is evicted from fastcache 408, the page is consistent with respect to a hard disk version and can simply be eliminated with a corresponding space previously occupied immediately available for use by another page to be moved from buffer pools 406.

In another option dirty pages from buffer pools 406 are written only to fastcache 408. A page write to fastcache 408 is very fast because of the inherent speed of this type of storage, for example a solid-state device. The page can then be considered evicted from buffer pools 406 and a slot occupied by the evicted page in buffer pools 406 can be used for another page. Durability of the data in the event of a crash is not a concern because fastcache 408 is persistent storage. In the event of a crash, the most recent copies of all pages can be found in fastcache 408. Using this option, pages in fastcache 408 can be more recent than pages on hard disk storage 412. As long as a page remains in the working set and thus in either fastcache 408 or buffer pools 406 (even if the page cycles between fastcache 408 and buffer pools 406), the page will never be written to disk thus never incurring a (relatively slow) I/O operation until such time as page naturally ages out of fastcache 408.

Pages that are very frequently accessed stay resident in buffer pools 406. As long as the pages remain in buffer pools 406, even when the pages have copies in fastcache 408, the copies age out of fastcache 408. Space utilization between buffer pools 406 and fastcache 408 is optimally maintained to avoid wasted space for such pages in fastcache 408 because of a same page occupying valued space in buffer pools 406 and fastcache 408.

Upon a consistent shutdown of the system, fastcache metadata 410 describing the contents of 410 is written to disk. Writing fastcache metadata 410 to disk enables a system to be primed on start up so that the buffer pool hash table of enhanced directory 306 is populated with descriptors representing pages that are in fastcache 408 before even a single page is accessed by applications. Priming avoids I/O operations for example, for the working-set pages required for reports and queries even in the case of planned outages.

When a system crash occurs (i.e., not planned shutdown) typically some I/O read activity is required to re-construct fastcache metadata 410 and to populate the buffer pool hash tables of enhanced directory 306. Various techniques are available to minimize time required to reconstruct lost fastcache metadata 410. Check pointing fastcache metadata 410 (perhaps to fastcache 408 because of persistence characteristic) at regular intervals during runtime and re-applying a change log of updates to fastcache 408 since the checkpoint. For example, a technique could also incorporate a generic write ahead logging facility typical of a database management system to occur as part of crash recovery.

Purge operations directed toward an object/tablespace/page must ensure that an old version of the page will not be resurrected from fastcache 408 when a crash follows a purge operation. Thus, purge operations must purge the page from both buffer pools 406 and fastcache 408. However, the entries of the hash tables of enhanced directory 306 contain descriptors for pages that are in fastcache 408 therefore pages can be easily located at runtime. Although some purge operations (for example, object/tablespace) traverse the descriptors of buffer pools 406 without going through the hash tables of enhanced directory 306 for sequential tier-1 402 performance these purge operations require additional consideration.

Figure 5:
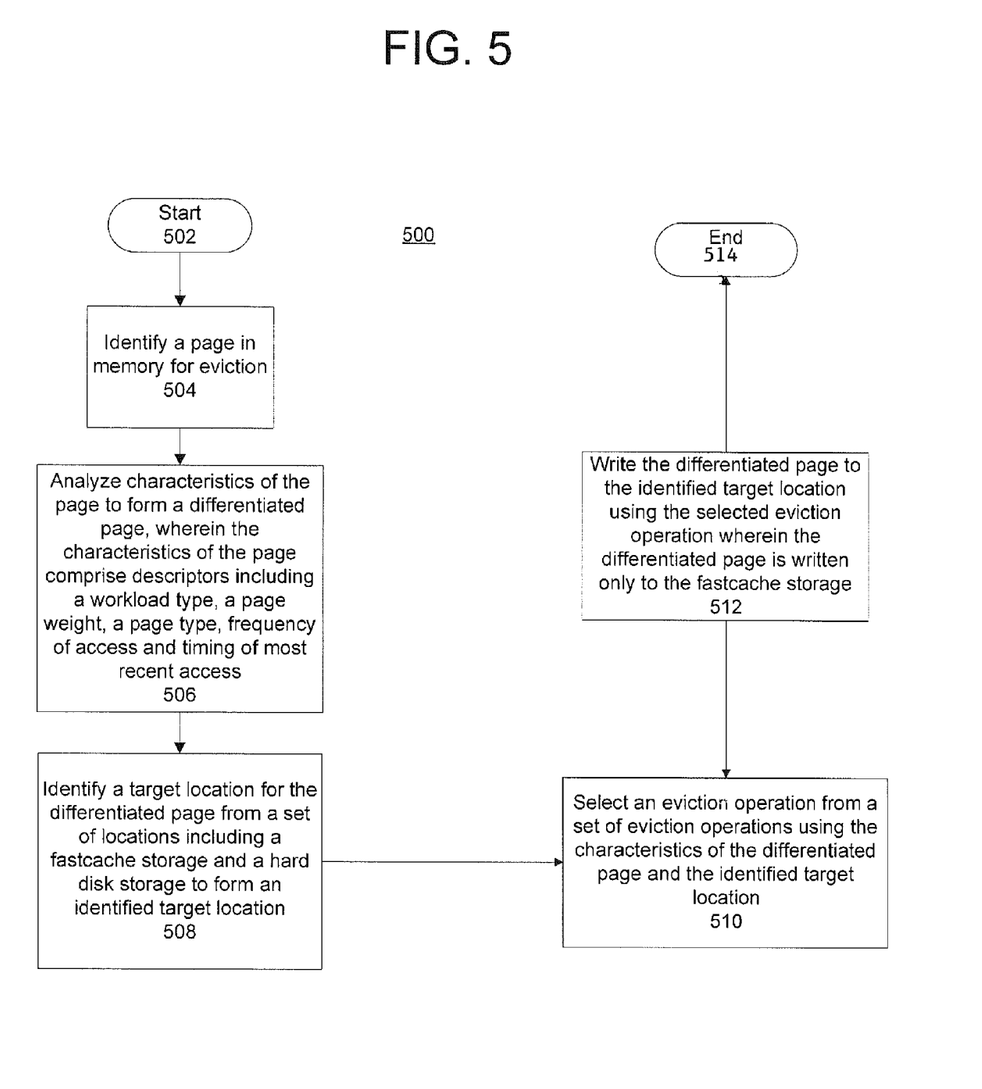
FIG. 5 is a flowchart of a process for buffer pool extension using the fastcache system of FIG. 3 in accordance with an embodiment of the disclosure.

With reference to FIG. 5 a flowchart of a process for logical buffer pool extension in accordance, with various embodiments of the disclosure is presented. Process 500 is an example of using fastcache system 300 of FIG. 3 for a logical extension of buffer pools in a database management system.

Process 500 begins at block 502 and identifies a page in a memory for eviction at block 504. The page in memory is representative of a page in buffer pool memory of a database management system. Identification of the page as an eviction candidate is made using known eviction determination techniques available with typical database management systems.

Process 500 analyzes characteristics of the page to form a differentiated page, wherein the characteristics of the page comprise descriptors including a workload type, a page weight and a page type at block 506. For example, page information contained within a directory supporting the logical buffer pool extension embodiment includes a header portion of a known format in which is a type field indicating a page type. A page type is typically representative of one of, but not limited to, data, index, load input file, and backup image. Further, the descriptors for a workload type may be representative of online, batch, an application specific usage and a page weight is a numeric indication of a relative importance of the page for maintaining a in memory residency status. Using the described analysis, for example, a page may be identified as a root page of an index set rather than a page in general. Page differentiation enables pages to be treated differently and specifically according to type rather generally.

Process 500 identifies a target location for the differentiated page from a set of locations including fastcache storage and a hard disk storage to form an identified target location at block 508. Target locations typically vary according to size and performance characteristics. Knowing characteristics of the differentiated page enable better placement of the page during movement from the memory. For example, a portion of an index structure is better suited to eviction to a high performance device while a typical data page may be safely moved to a low speed without adverse effect.

Process 500 selects an eviction operation from a set of eviction operations using the characteristics of the differentiated page and the identified target location at block 510. For example, the set of eviction operations includes an operation to write the page to an identified target location including both fastcache storage and a hard disk storage concurrently and another operation to write the page to an identified target location only in fastcache storage.

Process 500 writes the differentiated page to the identified target location using the selected eviction operation wherein the differentiated page is written only to the fastcache storage at block 512 and terminates thereafter at block 514.

Thus is presented in an illustrative embodiment a computer-implemented process for logical buffer pool extension. The computer-implemented process identifies a page in a memory for eviction, analyzes characteristics of the page to form a differentiated page, wherein the characteristics of the page comprise descriptors including a workload type, a page weight, a page type, frequency of access and timing of most recent access and identifies a target location for the differentiated page from a set of locations including a fastcache storage and a hard disk storage to form an identified target location. The computer-implemented process further selects an eviction operation from a set of eviction operations using the characteristics of the differentiated page and the identified target location and writes the differentiated page to the identified target location using the selected eviction operation wherein the differentiated page is written only to the fastcache storage.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for logical buffer pool extension, the method comprising:
    identifying, by a processor, a page in a memory for eviction;
    analyzing, by the processor, characteristics of the page to form a differentiated page, wherein the characteristics of the page comprise descriptors including a workload type, a page weight, a page type, frequency of access and timing of most recent access;
    identifying a target location for the differentiated page from a set of locations including a fastcache storage and a hard disk storage to form an identified target location;
    selecting an eviction operation from a set of eviction operations using the characteristics of the differentiated page and the identified target location; and
    writing the differentiated page to the identified target location using the selected eviction operation, wherein the differentiated page is written only to the fastcache storage.

2. The method of claim 1, wherein analyzing characteristics of the page to form a differentiated page comprises receiving information maintained in an enhanced directory, wherein the information in the enhanced directory is representative of a page residing in a location in the set of locations including the memory and the fastcache storage.

3. The method of claim 1, wherein the fastcache storage is a portion of a storage group located on a storage path and wherein the fastcache storage is associated with one of a database and specific buffer pools of the database and wherein the storage path is dynamically associated with the storage group.

4. The method of claim 1, wherein the fastcache storage is a portion of a storage group located on a storage path and wherein the fastcache storage is dynamically associated with a tablespace.

5. The method of claim 1, comprising:
recalling the differentiated page written only to the fastcache storage; and
writing the recalled differentiated page into the memory to retrieve data from the recalled differentiated page.

6. The method of claim 1, wherein writing the differentiated page to the identified target location using the selected eviction operation further comprises writing the differentiated page containing cold data only to the hard disk storage.

7. The method of claim 1, further comprising:
identifying a page in the fastcache storage for eviction using a same criteria as used for identifying a page in a memory for eviction; and
writing the identified page to the hard disk storage.

8. A computer program product for logical buffer pool extension, the computer program product comprising:
a non-transitory computer readable storage medium having program code embodied therewith, the program code executable by a processor to perform a method comprising:
identifying a page in a memory for eviction;
analyzing characteristics of the page to form a differentiated page, wherein the characteristics of the page comprise descriptors including a workload type, a page weight, a page type, frequency of access and timing of most recent access;
identifying a target location for the differentiated page from a set of locations including a fastcache storage and a hard disk storage to form an identified target location;
selecting an eviction operation from a set of eviction operations using the characteristics of the differentiated page and the identified target location; and
writing the differentiated page to the identified target location using the selected eviction operation wherein the differentiated page is written only to the fastcache storage.

9. The computer program product of claim 8 wherein analyzing characteristics of the page to form a differentiated page comprises receiving information maintained in an enhanced directory, wherein the information in the enhanced directory is representative of a page residing in a location in the set of locations including the memory and the fastcache storage.

10. The computer program product of claim 8 wherein the fastcache storage is a portion of a storage group located on a storage path and wherein the fastcache storage is associated with one of a database and specific buffer pools of the database and wherein the storage path is dynamically associated with the storage group.

11. The computer program product of claim 8 wherein the fastcache storage is a portion of a storage group located on a storage path and wherein the fastcache storage is dynamically associated with a tablespace.

12. The computer program product of claim 8, wherein the method further comprises:
recalling the differentiated page written only to the fastcache storage; and
writing the recalled differentiated page into the memory to retrieve data from the recalled differentiated page.

13. The computer program product of claim 8 wherein the writing the differentiated page to the identified target location using the selected eviction operation further comprises writing the differentiated page containing cold data only to the hard disk storage.

14. The computer program product of claim 8, wherein the method further comprises:
identifying a page in the fastcache storage for eviction using a same criteria as used for identifying a page in a memory for eviction; and
writing the identified page to the hard disk storage.

15. An apparatus for logical buffer pool extension, the apparatus comprising:
a communications fabric;
a memory connected to the communications fabric, wherein the memory contains computer executable program code;
a processor unit connected to the communications fabric, wherein the processor unit executes the computer executable program code to direct the apparatus to:
identify a page in a memory for eviction;
analyze characteristics of the page to form a differentiated page, wherein the characteristics of the page comprise descriptors including a workload type, a page weight, a page type, frequency of access and timing of most recent access;
identify a target location for the differentiated page from a set of locations including a fastcache storage and a hard disk storage to form an identified target location;
select an eviction operation from a set of eviction operations using the characteristics of the differentiated page and the identified target location; and
write the differentiated page to the identified target location using the selected eviction operation wherein the differentiated page is written only to the fastcache storage.

16. The apparatus of claim 15 wherein the analyzing characteristics of the page to form a differentiated page comprises receiving information maintained in an enhanced directory, wherein the information in the enhanced directory is representative of a page residing in a location in the set of locations including the memory and the fastcache storage.

17. The apparatus of claim 15 wherein the fastcache storage is a portion of a storage group located on a storage path and wherein the fastcache storage is associated with one of a database and specific buffer pools of the database and wherein the storage path is dynamically associated with the storage group.

18. The apparatus of claim 15 wherein the fastcache storage is a portion of a storage group located on a storage path and wherein the fastcache storage is dynamically associated with a tablespace.

19. The apparatus of claim 15 wherein the computer executable program code further directs the apparatus to:
recall the differentiated page written only to the fastcache storage; and
write the recalled differentiated page into the memory to retrieve data from the recalled differentiated page.

20. The apparatus of claim 15 wherein writing the differentiated page to the identified target location using the selected eviction operation further comprises writing the differentiated page containing cold data only to the hard disk storage.

* * * * *